United States Patent [19]

Robinsky et al.

[11] 4,436,633
[45] Mar. 13, 1984

[54] FILTRATION THICKENING METHOD AND APPARATUS

[76] Inventors: Eli I. Robinsky, 66 Lytton Blvd., Toronto, Ontario M4R 1L3; David H. Laing, 16A Henry St., Toronto, Ontario M5T 1X1, both of Canada

[21] Appl. No.: 292,737

[22] Filed: Aug. 14, 1981

[51] Int. Cl.³ .................. B01D 29/16; B01D 29/32; B01D 29/38
[52] U.S. Cl. .................. 210/791; 210/323.2; 210/333.01; 210/497.01
[58] Field of Search .................. 210/323.2, 411, 485, 210/488, 489, 455, 484, 497.01, 791, 507, 333.1, 503, 333.01, 504; 428/190, 196

[56] References Cited

U.S. PATENT DOCUMENTS

| | | | |
|---|---|---|---|
| 231,066 | 8/1880 | Long | 210/323.2 |
| 1,194,646 | 8/1916 | Linden | 210/798 |
| 1,585,817 | 5/1926 | Bailey et al. | 210/411 |
| 1,716,040 | 6/1929 | Genter | 210/142 |
| 1,945,839 | 2/1934 | Maltitz | 210/411 |
| 2,338,549 | 1/1944 | Shriver et al. | 210/503 |
| 2,341,097 | 2/1944 | Heebink | 210/484 |
| 2,568,085 | 9/1951 | Naugle | 210/333.01 |
| 2,854,140 | 9/1958 | Muller | 210/90 |
| 2,940,517 | 6/1960 | Skellem | 158/36.4 |
| 3,019,184 | 1/1962 | Brown | 210/82 |
| 3,019,903 | 2/1962 | Daane | 210/110 |
| 3,233,739 | 2/1966 | Zievuers et al. | 210/323.2 |
| 3,356,215 | 12/1967 | Miles | 210/82 |
| 3,374,889 | 3/1968 | Wallace | 210/77 |
| 3,598,238 | 8/1971 | Collins | 210/138 |
| 3,618,767 | 11/1971 | Thummel | 210/77 |
| 3,630,362 | 12/1971 | Matthews | 210/108 |
| 3,645,400 | 2/1972 | Floyd | 210/108 |
| 3,659,718 | 5/1972 | Brociner et al. | 210/333.01 |
| 3,926,804 | 12/1975 | McClure | 210/76 |
| 4,051,033 | 9/1977 | Blace | 210/333.01 |
| 4,090,962 | 5/1978 | Braukman | 210/108 |
| 4,155,850 | 5/1979 | Rathbone et al. | 210/98 |
| 4,243,533 | 1/1981 | Savolainen et al. | 210/323.2 |
| 4,264,445 | 4/1981 | Lumikko et al. | 210/323.2 |

FOREIGN PATENT DOCUMENTS

| | | | |
|---|---|---|---|
| 447057 | 3/1948 | Canada | 210/323.2 |
| 790398 | 7/1968 | Canada . | |
| 2165012 | 7/1972 | Fed. Rep. of Germany . | |
| 404309 | 1/1934 | United Kingdom | 210/323.2 |
| 603443 | 6/1948 | United Kingdom . | |
| 904946 | 9/1962 | United Kingdom . | |
| 1357643 | 6/1974 | United Kingdom . | |
| 538727 | 12/1976 | U.S.S.R. . | |

*Primary Examiner*—Charles N. Hart
*Assistant Examiner*—John W. Czaja
*Attorney, Agent, or Firm*—Burns, Doane, Swecker & Mathis

[57] ABSTRACT

A filter-thickening apparatus including a thickener tank having tubular filter units suspended therein is disclosed. A liquid-solids suspension is supplied to the tank and an overflow pipe is spaced in a filtrate compartment above the filter units for draining a filtrate liquid from the tank. The filter units preferably include either an accumulator grating or a filter cloth which is sealed along narrow bands to form a pattern of filtering areas or both. Processes for filtering the liquid-solids suspension are also disclosed.

21 Claims, 8 Drawing Figures

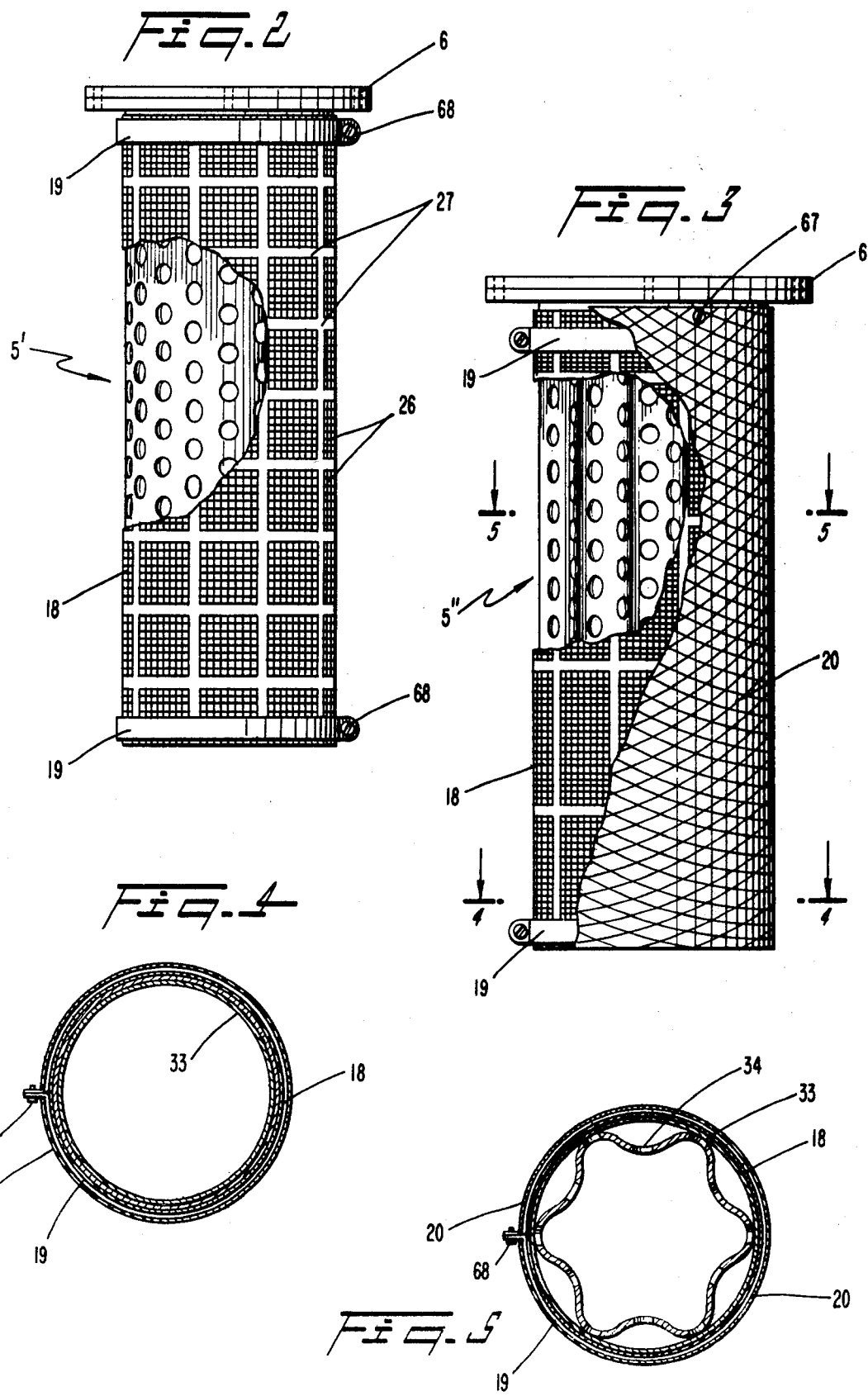

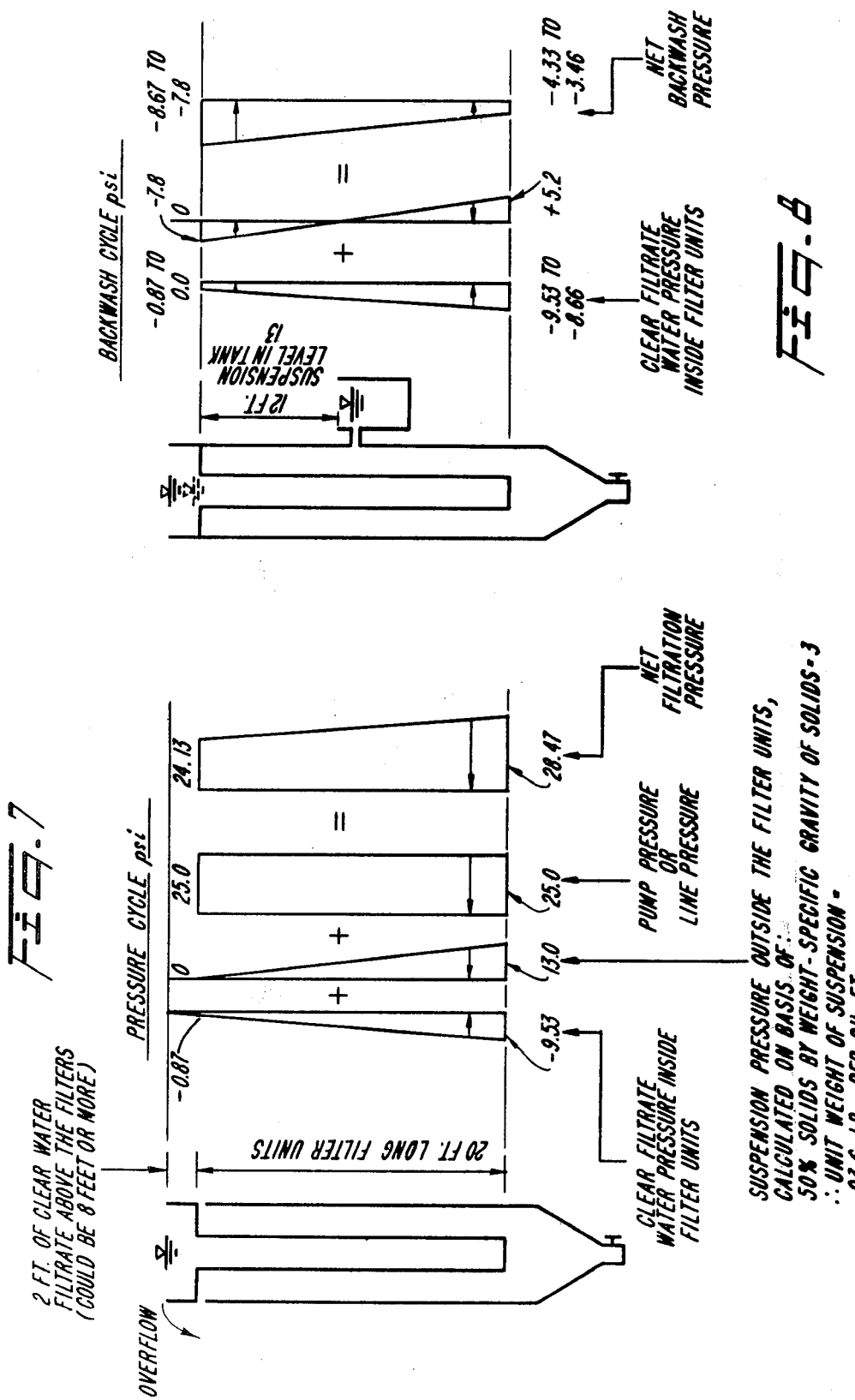

FILTRATION THICKENING METHOD AND APPARATUS

BACKGROUND AND SUMMARY OF THE INVENTION

This invention relates to filtration methods and apparatus and, more particularly, to filtration thickening methods and apparatus which can be used, for example, in ore processing and tailing thickening operations in the mining industry.

In mining operations, water, with and without chemical additives, is commonly used to separate the ore from the finely crushed rock and earth particles. All matter that is not ore is known as mine tailing and it is by far the largest portion of material involved in the operations. Mine tailing has no commercial value and is disposed of with a considerable amount of process water in large man-built tailing ponds provided for this purpose. In order to reduce the cost of recycling the process water and also to reduce the size and hence the cost of the tailing ponds and tailing conveyance equipment it is common practice to remove as much process water as possible before conveying the waste solids to the disposal pond. A currently used method for this purpose is to pass the tailing through settlement basins known as thickeners which may be as large as 450 feet in diameter. As the solid particles settle by gravity on the bottom of the basin, a rake pushes the particles toward an outlet at the center of the basin. The mixture of collected solids together with the process water that escapes through this outlet is known as tailing underflow. The underflow is pumped from the center outlet to the tailing pond. Clear water flows over the top of the wall around the perimeter of the basin, and is recovered as process water for recycling. The cost of building and operating basin thickeners can be very high. Furthermore, such gravity sedimentation-type basin thickeners can generally thicken the tailing to only 10 to 50 percent solids by weight, whereas it would be desirable to achieve values of 30 to 75 percent solids, respectively, the value being dependent on the type of tailing. Therefore a considerable amount of water still remains with the tailing. The use of chemical flocculants in such machinery is used to increase the rate of sedimentation but it has little effect on the final concentration of solids in the underflow.

In the known filtration thickening apparatus, the suspension of solids that is to be thickened is introduced to one side of a filter cloth. The perforations of the filter cloth are sized to allow the passage of the liquid component of the suspension, but to prevent the passage of the solids component. Most filter-cloths consist of a woven fabric, commonly made of synthetic fibers, either loosely or tightly woven, as determined by the grain size of the suspended solids and by the desired clarity of the resulting filtrate.

A known way of forcing liquid through the filter-cloth is to raise the pressure of the suspension to a higher value than the pressure of the filtrate on the opposite side of the filter cloth. Another known way of forcing liquid through the filter cloth is by applying a suction or vacuum on the filtrate side of the filter cloth. As the liquid flows through the filter-cloth, the suspended solids impinge on it, developing thereon a layer of solids known as filter cake. As the filter cake thickness grows, the passage of liquid through the filter-cloth is impeded. In order to clear the filter cloth at specific intervals of time or at specific pressure differentials that are eventually reached between the suspension and filtrate sides, the pressure differential on the two sides of the filter cloth is reversed. This causes a reversal in the flow of liquid and therefore some of the filtrate is forced to return to the suspension side. In so doing, the filtrate disengages the accumulated filter cake which then settles in the form of sheets and strips through the suspension compartment to the bottom of the equipment from where the thickened suspension can be withdrawn. This is commonly termed the backwash cycle.

Because the filter cloth is not normally strong enough to withstand the desirable filtration pressure, nor in some cases the desired backwash pressure, it is common practice to provide support means on either one or both sides of the filter cloth. These support means generally consist of rigid cages, screens, or perforated plates. The supports allow the passage of liquid but prevent the filter cloth from bursting.

Suspensions from different industrial processes vary chemically, and in both size and shape of the particles that form their solids component. It can therefore be reasonably expected that various filter cakes will differ in their thicknesses, weights, toughnesses and the facility with which they disengage from the filter cloth. A particular filter cake may be very soft and light, such as results from filter thickening of natural clay slimes, a waste product from the processing of phosphate ore. On the other hand, the filter cake may be relatively dry, heavy and tough such as the product of filter thickening of tailing waste from base metal mining operations. It has been found that the gradation and specific gravity of the solids play a primary role in the ease or difficulty with which filter cake can be disengaged from the filter cloth. Generally, the coarser the fraction, the easier the build up of filter cake on the filter cloth and thus the easier the disengagement of the filter cake from the filter cloth. To be commercially practical, the filter or thickener apparatus must be capable of operating effectively and efficiently with a soft and light filter cake, or with a coarse filter cake, the apparatus being designed as required to suit one or several of the various industrial processes.

One major drawback of known filter thickeners is that a very large quantity of backwash filtrate or cleansing liquid is required to disengage the filter cake from the cloth and to clean the filter cloth to permit the cycle to be repeated. The more backwash liquid that is used, the less efficient becomes the system, the efficiency being measured by the net gain of filtrate over the filtrate lost during the backwashing cycle. It has been proposed to utilize continuous processes having multiple tubular filter elements which operate sequentially. However, these continuous processes do not obviate the problem of large losses of fluid during the backwash cycle of any individual filter element.

It is therefore, an object of the present invention to provide a method and apparatus for efficient filtration and thickening of tailing to reduce the cost of disposal.

It is a further object of this invention to provide a method and apparatus for removing liquid from a slurry or solids suspension at a high flow rate while being relatively inexpensive to construct and operate.

It is yet another object of the present invention to provide a method and apparatus for drawing water from tailing at a high flow rate that requires a relatively small area of space for the apparatus, is simple to construct and operate, and has a minimum of moving parts.

It is still another object of the present invention to provide several filtering methods and apparatuses designed for the various types of filter cake encountered in filtration.

Filtration thickening apparatus according to a preferred embodiment of the present invention includes a thickener tank to which the tailing or other liquid-solid suspension is supplied. The tank has a receiver portion at the bottom for the accumulation of filter cake and a filtrate compartment at the top for collection of filtrate. Individual tubular filter units are suspended in the tank below the filtrate compartment and above the filter cake receiver portion. An overflow pipe is spaced above the filter units in the filtrate compartment for draining the filtrate liquid from the tank. A supply pipe enters the tank above the filter cake receiver portion. The filter units preferably include either an accumulator grating or a filter cloth which is sealed along narrow bands to form a pattern of filtering areas or both. A centrifugal pump supplies the tailing from a holding tank to the thickener tank and a valve controls the discharge of filter cake from the receiver portion of the thickener tank.

The process of filtration thickening a liquid-solids suspension in accordance with a preferred embodiment of the present invention includes pumping the suspension into a thickener tank. The liquid portion of the suspension is forced to flow through the filter cloth as filtrate and the solids portion collects on the filter cloth as filter cake. The filter cloth preferably is separated into filtering areas by liquid impermeable strips to improve the sloughing off of the filter cake during backwashing. A portion of the filtrate is intermittently backwashed to slough off the solids portion from the filter cloth. A centrifugal pump supplies the tailing to the thickener tank, forcing the liquid through the filter units and upwardly to a filtrate compartment from which the clarified liquid is discharged by gravity. Backwashing is accomplished by stopping the pump and simultaneously opening the underflow valve to discharge a portion of the filter cake underflow which has accumulated in the receiver portion of the tank. As soon as the pump is stopped the hydrostatic head of the suspension in the thickener tank causes part of the suspension to drain back through the pump and into a holding tank which is disposed at a lower elevation. This action, together with the discharge of some filter cake underflow, creates a lower head in the thickener tank suspension than in the clarified liquid filtrate compartment, thus filtrate flow is reversed. Reversed flow from the filtrate compartment causes the clarified liquid to flow through the filter units in the reverse direction, thereby dislodging the filter cake and causing it to fall into the receiver at the bottom of the tank from whence it will be removed by the opening of the underflow valve in subsequent backwash cycles. The process can be repeated at time intervals as selected according to the rate at which the filter cake builds up on the filter units.

BRIEF DESCRIPTION OF THE DRAWINGS

A preferred embodiment of the present invention is described with reference to the accompanying drawings wherein like members bear like reference numerals and wherein:

FIG. 2 is a side view, partially in cross section, of a modified form of a filter unit according to the present invention;

FIG. 3 is a side view, partially in cross section, of a second modified form of the filter unit according to the present invention;

FIG. 4 is a cross sectional view of the filter unit of FIG. 3 along line 4—4 in FIG. 3;

FIG. 5 is a cross sectional view of the filter unit of FIG. 3 along line 5—5 in FIG. 3;

FIG. 7 is a diagram of pressure versus elevation during a pressure cycle of the filter thickener of the present invention; and, FIG. 8 is a diagram of pressure versus elevation during a backwash cycle of the filter thickener of FIG. 7.

DETAILED DESCRIPTION OF THE PREFERRED EMBODIMENTS

Figure 1:
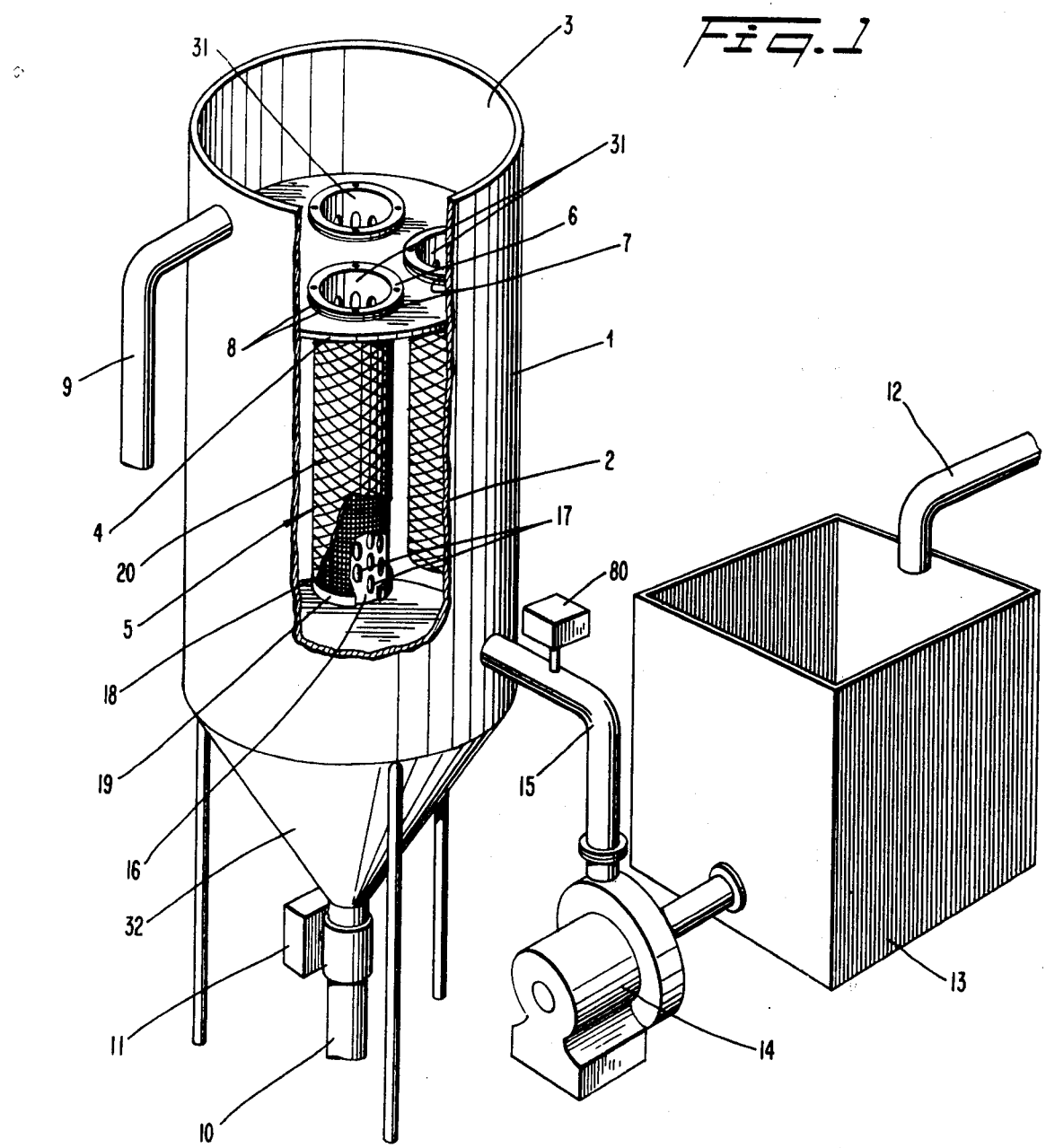
FIG. 1 is an isometric view, partially in cross section, of a preferred embodiment of the filter thickener apparatus according to the present invention.

With reference to FIG. 1, a preferred embodiment of a filter thickener apparatus according to the present invention includes a thickener tank 1 having a suspension compartment 2 and a filtrate compartment 3. A separation plate 4 separates the suspension compartment 2 from the filtrate compartment 3. The separation plate 4 contains a plurality of approximately equally spaced holes or sockets 31 into each of which is placed a filter unit 5. Each filter unit 5 is suspended by a collar 6 in the hole 31 of the separation plate 4. Each collar 6 has a gasket 7 and is attached by bolts 8 to the separation plate 4 to ensure that there is no leakage of liquid between the filtrate compartment 3 and the suspension compartment 2 around the collars 6.

The filtrate compartment 3 is provided with a filtrate overflow pipe 9 which is spaced a predetermined distance above the separation plate 4 in order to provide adequate backwash fluid and backwash pressure for the system. The vertical distance between the separation plate 4 and the lower end of the suspension compartment 2 is substantially greater than the length of each of the filter units 5, to provide a space in the lower portion of the suspension compartment 2 as a receiver portion for the accumulation of filter cake. The bottom of the receiver portion in the suspension compartment 2 is in the shape of a funnel 32 which is connected to an underflow pipe 10. A mechanized valve 11 controls the outflow of consolidated filter cake material through the underflow pipe 10.

A supply pipe 12 supplies the liquid-solids suspension that is to be thickened into a holding tank 13. The suspension is pumped from the holding tank 13 by a first centrifugal pump 14 through a centrifugal pump outlet pipe 15 and into the suspension compartment 2.

In an alternate embodiment, a second valve 80 may be provided on the centrifugal pump outlet pipe 15. The second valve 80 may be used to block the flow of suspension through the centrifugal pump outlet pipe 15 during the time that the valve 11 at the bottom of the thickener tank 1 is opened. When the second valve 80 has closed the centrifugal pump outlet pipe 15, the centrifugal pump 14 may be deactivated until the second valve 80 opens again.

Four filter units 5 are provided in the thickener tank, although only three units are visible in FIG. 1. However, the number of filter units that can be accomodated is only dependent upon the size of the thickener tank 1 and the diameter of each of the filter units 5. Each filter unit 5 has a rigid pipe 16 which is closed at the bottom and open at the top and connected to the collars 6 by which it is suspended on the separation plate 4. The rigid pipe 16 has a plurality of perforations 17. Each perforated pipe 16 is surrounded by a filter cloth sleeve 18 which may be held in place by two strips 19 positioned at the bottom and the top edge of the rigid pipe 16. Each of the strips 19 may be tightened by the use of a strip fastener 68 (FIG. 2). The filter cloth 18 rests on or is stretched against the rigid pipe 16 which acts to support and prevent bursting of the filter cloth 18 under filtration pressure.

A loose-fitting accumulator grating 20 (FIG. 1) surrounds the filter cloth 18 over the full length of the perforated pipe 16. The accumulator grating 20 may be fastened on the filter unit 5 by fasteners 67, (FIG. 3) or other suitable means. The accumulator grating 20 acts to accumulate and grip the filter cake during the backwash phase of the process and to prevent bursting of the filter cloth under backwash pressure.

During the filtering process the pressure created in the suspension compartment 2 by the first centrifugal pump 14 is higher than the pressure within the filter units 5. This pressure difference forces the filter cloth 18 against the rigid pipe or support pipe 16 and causes the liquid portion of the suspension to flow from the outside to the inside of each filter unit. Filtrate passes through the filter cloth and through the perforations in the support pipe 16 and flows upwardly into the filtrate compartment. The solids from the suspension adhere to the filter cloth 18 to form the filter cake. When a sufficient depth of filter cake has accumulated on the suspension side of the filter cloth 18, a rapid reversal of pressures on the suspension and filtrate side causes the filter cloth to flop across the space provided between the support pipe 16 and the accumulator grating 20. The filter cloth 18 is pressed against the accumulator grating 20 and the filter cake which is formed on the filter cloth is thus squeezed into the spaces on the accumulator grating and held therein. The pressure on the suspension side may now be raised to cause a return flop of the filter cloth 18. It has been found that the filter cake remains impinged on the accumulator grating 20 and the filter cloth 18 flops back in a clean condition. The gripping action of the accumulator grating 20 reduces the backwash requirement to a minute film of water while allowing complete disengagement of the filter cake from the filter cloth 18. With this system, no waiting period is required for the filter cake to fall away from the filter cloth.

The return flop is unimpeded by the presence of filter cake impinged on the accumulator grating 20 because as soon as the pressure in the suspension compartment 2 is raised, the filter cake in a few of the openings in the accumulator grating which were clogged with filter cake is ejected through or washed through the accumulator grating. The pressurized suspension immediately finds its way through these few openings and pushes back the filter cloth 18 against the support pipe 16, and the cycle is repeated.

The filter units 5 of FIG. 1 would be most useful in cases where the filter cake is thin, lightweight, soft and cohesive and therefore tends to adhere to the filter cloth. The rigid pipe or support screen 16 and the accumulator grating 20 are spaced apart at least a distance approximating the thickness of the anticipated filter cake. Whereas the support screen 16 may consist of punched metal, or rigid bars or woven mesh or any other support system which is used in the industry, the accumulator grating 20 should preferably be of a rigid, deeper construction to enmesh and retain the filter cake. Expanded sheet metal has been used very successfully for the purpose. The openings in the accumulator grating 20 may be 1 sq. cm to 5 sq. cm, for example. The twisted components of this mesh act as excellent gripping surfaces for the filter cake. Alternatively, several contiguous layers of woven mesh could also be used.

In operation, the centrifugal pump 14 pumps the liquid-solids suspension from the tank 13 into the suspension compartment 2, creating a high pressure therein, since the compartment 2 is closed and fluid can flow out of the compartment only through the filter units 5. As the suspension is forced against the filter cloth 18, the liquid is forced through the filter cloth to the interior of the perforated pipe 16, and the solids accumulate on an outer surface of the filter cloth 18 as filter cake. The size of the filter cloth openings would determine the clarity of the liquid which becomes filtrate when it passes through the filter cloth 18. The filtrate then flows up into the filtrate compartment 3 and accumulates in that compartment until its level reaches the overflow pipe 9 which then removes the filtrate for further use in the mining operation, or for other purposes. During the production of filtrate, the high pressure of the suspension keeps the filter cloth 18 pressed against the perforated support pipe 16.

When the filter cake has developed to a reasonable thickness or when the production of filtrate slows, due to the obstructing presence of an ever-thickening filter cake, the centrifugal pump 14 is stopped. The pressure in the suspension compartment 2 drops immediately because the hydraulic head supplied by the pump ceases. The suspension flows back through the pump 14 into the holding tank 13 because the level of the suspension in the holding tank 13 is lower than the level of the filtrate in the filtrate compartment 3. This flow of suspension causes the filtrate to flow back through the filter units 5 and dislodges the filter cake. The intensity of the backwash pressure acting over the length of each filter unit 5 is determined by the difference in levels of the liquid in the holding tank 13 and the filtrate compartment 3. The backwash process takes two to fifteen seconds.

At the same time that the centrifugal pump 14 is stopped the valve 11 at the bottom of the thickener tank 1 may be opened to remove some of the filter cake which has accumulated in the receiver portion at the bottom of the suspension compartment 2 during previous cycles. Opening this valve 11 will accelerate the downward flow of the filtrate which accelerates, in turn, the commencement of the backwash cycle. The filtrate retained in the filtrate compartment 3 flows back down the perforated pipes 16 to initiate the backwash cycle forcing the filter cloth away from the perforated pipes 16 and expanding the filter cloth 18 outwardly against the accumulator grating 20. The filter cake on the filter cloth 18 is thus squeezed into the spaces of, and is gripped by, the accumulator grating 20. As soon as this happens, the centrifugal pump 14 is again started and the pressure in the suspension compartment rises again. As the pressure in the suspension compartment 2 rises the filter cloth 18 flops back against the perforated pipe 16 leaving the filter cake on the accumulator grating 20.

Alternatively, at the same time the valve 11 at the bottom of the thickener tank 1 is opened, a second valve 80 may shut off flow to and from the centrifugal pump outlet pipe 15. With the valve 11 open and the second valve 80 closed, the suspension will flow towards the bottom of the thickener tank 1 instead of back through the centrifugal pump 14. The flow of suspension towards the bottom of the thickener tank 1 will also cause a downward flow of the filtrate from the filtrate compartment 3 to initiate the backwash cycle. After the backwash cycle is completed (as explained in the preceding paragraphs) the second valve 80 is opened and the valve 11 is closed. After restart of the first centrifugal pump 14, the pressure in the suspension compartment 2 will again rise and the filtration process will resume.

As either of these processes is repeated, the accumulator grating fills to capacity with filter cake and the excess filter cake which has been squeezed all the way through the accumulator grating 20 falls down to the bottom of the suspension compartment 2. The filter cake is allowed to accumulate at the bottom of the suspension compartment 2 and thus to consolidate over a substantial depth in the lower portion of the suspension compartment before a quantity is extruded periodically through the underflow pipe 10 when the valve 11 is open. The valve 11 is preferably either completely open or completely closed and is not kept in a partially open position.

Because the thickener tank 1 is preferably of substantial height and because it preferably has a relatively small diameter the lumps of filter cake which have fallen to the bottom of the suspension compartment 2 are easily extruded by the substantial hydrostatic head at the bottom of the thickener tank 1. This arrangement avoids the necessity of having to rake or mechanically remove the filter cake as is required in the conventional thickening systems. The rate of removal of the lumps of filter cake together with some of the suspension which is inevitably trapped between the lumps of filter cake will determine the thickening which can be achieved. To reduce the amount of trapped suspension being removed and thereby increase the effect of thickening, the lumps of filter cake may be allowed to accumulate at the bottom of the suspension compartment 2 so that they will be compressed by their own weight into a more dense mass. This will expel upwards some of the suspension fluid trapped between the filter cake lumps thus achieving a higher effective thickening.

With reference now to FIG. 2, a modified form of the filter unit 5' has the rigid perforated pipe 16 with the plurality of perforations or holes 17 therein. The filter cloth sleeve 18 is disposed over the perforated pipe 16 and the filter cloth is secured by a pair of support straps 19 to the perforated pipe 16. The filter cloth 18 has been separated into a plurality of filtering areas 26 by a plurality of fluid impermeable bands or strips 27. The filter cloth is sealed along these bands or strips 27 to provide a pattern of filtering areas which could be square, rectangular, triangular or any other two-dimensional area. The filter cake will then form only on the filtering areas 26 because the bands 27 are fluid impermeable. The bands 27 facilitate filter cake disengagement from the filter cloth 18 during backwash. The filter cloth 18 may be surrounded by an accumulator grating 20 (not illustrated).

Filter cake is prevented from forming on top of the sealed strips 27 and therefore the cake can only form over the filtering areas on the surface of the cloth 18. Disengagement is thereby facilitated because the cake pieces are small and can immediately start sliding down the filter cloth 18 as the backwash cycle commences. There is no impediment to the intitial sliding of the cakes because each filter cake piece is surrounded by a clear and narrow margin without filter cake. The filter cake does not have to be broken up and pushed outwardly by the backwash as would happen if the filter cloth 18 were covered by one large surface of continuous filter cake. This version of the filter cloth operates very effectively with a tailing suspension comprised of a coarse gradation of solids which forms a tough, thick and heavy filter cake. The filter cake pieces, being heavier than the suspension, once disengaged from the filter cloth 18, will fall through the suspension to the bottom of the suspension compartment 2 from where they can be withdrawn.

The filter cloth 18 can be sealed, for example, by the application of a somewhat flexible paint which can be coated along narrow one-half inch to five eights inch bands to form, for example, square grids of six inches by six inches. Of course other ways of creating the sealed narrow bands, such as impervious tape and other widths and other pattern shapes and sizes could naturally be used for the same purpose.

An accumulator grating 20 may be also used with the filter unit 5'. Because the strips 27 are impermeable and will prevent any filter cake from accumulating over themselves, the accumulator grating 20 will always be free of filter cake opposite these treated strips or areas. The suspension can thus readily flow through the accumulator grating 20 at these locations to begin the next filtration cycle.

With reference now to FIG. 3, a second modified form of the filter unit 5" has a corrugated perforated pipe 33 which is surrounded by a filter cloth sleeve 18. The perforated pipe 33 is corrugated in order to avoid stretching the filter cloth 18 during its flopping action. Thus the filter cloth 18 is prevented from being expanded against the larger diameter accumulator grating 20. The perforated pipe 33 which serves as the support screen is preferably shaped to be vertically corrugated over a central portion of its length (see FIG. 5). The end portions of the perforated pipe 33 are not corrugated (see FIG. 4). It has been found that horizontal corrugations will not perform adequately, rather, the corrugations should be substantially vertical or at least spiral. In other words, the corrugations must have a vertical component. The number of corrugations and the depth of the corrugations 34, see FIG. 5, are designed so that the perimeter distance along the surface of the perforated pipe 33 is substantially the same as the inside perimeter distance of the accumulator grating 20. Thus the filter cloth 18 remains unstressed whether it is being pressed inwardly against the perforated pipe 33 during filtrate and filter cake production or it is being pressed outwardly against the accumulator grating 20 during the backwash cycle. The perforated pipe 33 is preferably made of a perforated metal which is rolled and then spot-welded.

Figure 6:
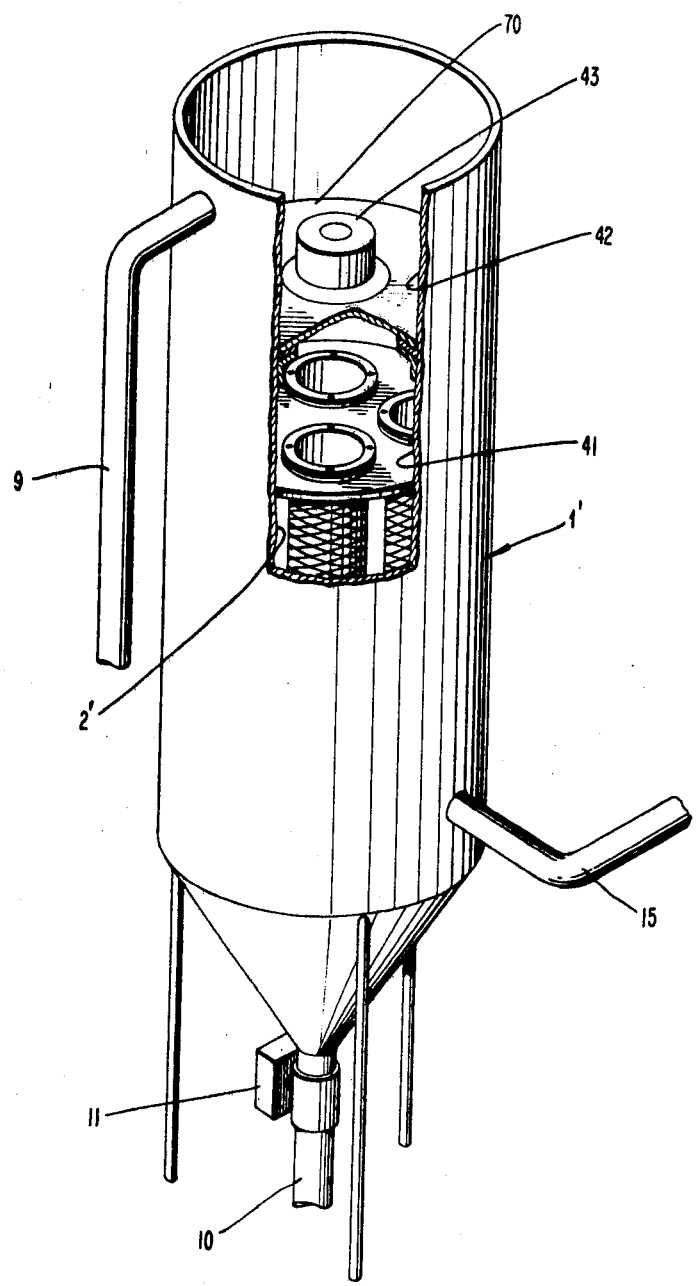
FIG. 6 is an isometric view, partially in cross section, of a modified form of the thickener tank according to the present invention.

With reference now to FIG. 6, a modified form of thickener tank 1' includes a suspension compartment 2', a first filtrate compartment 41 and a second filtrate compartment 42. A second centrifugal pump 43 is located between the two filtrate compartments 41, 42. The second centrifugal pump 43 is mounted on a second separating plate 70 which is secured to the thickener tank 1'. The second centrifugal pump 43 pumps filtrate, preferably a non-abrasive clear liquid, from the second filtrate compartment 42 down into the first filtrate compartment 41. When such pumping occurs, the backwash pressure in the first filtrate compartment 41 exceeds the pressure normally developed by the first centrifugal pump 14 through the centrifugal pump outlet pipe 15 in the suspension compartment 2'. This pressure difference creates the required backwash flow through the filter cloth 18 (not visible in FIG. 6) as some suspension fluid is forced back through the centrifugal pump outlet pipe 15. Using this preferred embodiment, it might take two to ten minutes to accumulate the filter cake and two to fifteen seconds to backwash.

At the termination of the backwash cycle, the second centrifugal pump 43 is stopped and the line pressure through the first centrifugal pump outlet pipe 15 again raises the pressure in the suspension compartment 2 to commence filtrate production. The filtrate flows from the inside of each filter unit 5 into the first filtrate compartment 41 and hence through the non-operating second centrifugal pump 43 and into the second filtrate compartment 42. In the second filtrate compartment 42 the filtrate accumulates until it reaches the overflow pipe 9 which removes the filtrate from the thickener tank 1'.

As a specific example for constructing and operating the apparatus of this invention the following components are suitable. The filter cloth sleeve 18 for any of the above-described embodiments may be obtained from the Barrday division of Wheelabrator Corporation of Canada Limited located in Cambridge, Ontario and in Montreal, Quebec. A typical filter cloth material is style number fn2080 which is a 2/2 weave nylon fabric weighing 14.6 ounces per square yard. Another typical filtration cloth is style number f3030 which is a plain weave terylene fabric weighing 4 ounces per square yard. A United States company which manufactures filter cloth is Albany International Technical Fabrics Division 1400 Clinton Street Buffalo N.Y. 14206.

The preferred embodiment of the filter unit 5 may be eight to twelve inches in diameter and is twelve to twenty feet long although lengths over twenty feet may be used. The perforations in the perforated pipes 16, 33 may be located one quarter inch away from each other and may be one eighth inch in diameter. A preferred thickener tank 1 may be twelve feet in diameter and thirty to forty feet high.

As many as eighty filter units 5 would fit into the preferred thickener tank 1. Preferably the filtrate overflow pipe 9 is disposed at least two feet above the separation plate 4 which separates the filtrate compartment 3 from the suspension compartment 2 although, as much as eight feet or more of filtrate could be disposed in the filtrate compartment to provide the hydrostatic head used during the backwash cycle. That is, the filtrate overflow pipe 9 could be located eight feet above the separation plate 4. The system does not need a rake at the bottom because of the pressure exerted by the hydrostatic head on the filter cake disposed in the funnel 32.

With reference now also to FIG. 7, a pressure cycle for a twenty foot long filter unit 5 in a thickener tank 1 having a two foot overflow can be calculated. Preferably, the filtrate is water. The suspension pressure outside the filter unit 5 is calculated on the basis of a 50 percent solids by weight mixture having a specific gravity of the solids of 3. Therefore, the unit weight of the suspension is 93.6 pounds per cubic feet. The pump or line pressure is assumed to be 25 lbs per square inch. The pressure of the clear filtrate or water inside the filter tube varies from zero at the point of overflow two feet above the filter unit 5, to −9.53 psi at the bottom of the filter unit (the negative sign is used for those pressures that oppose filtrate and filter cake production but aid the backwash cycle). At the top of the twenty foot long filter unit 5, the pressure of the filtrate is −0.87 psi. Naturally, the suspension pressure at the top of the filter unit is zero, and increases linearly so that at the bottom it is 13.0 psi. Adding the pressures, the net filtration pressure at the top of the filter unit is 24.13 psi whereas the pressure at the bottom is 28.47 psi during the pressure cycle.

With reference now also to FIG. 8, a backwash cycle for a twenty foot long filter unit 5 having a two foot overflow and a suspension level in holding tank 13 located twelve feet from the top of the twenty foot long filter unit may be calculated. The clear filtrate water pressure inside the filter unit during the backwash cycle would drop at the top of the filter unit from −0.87 psi at the start of the backwash cycle to zero at the end of the cycle, whereas at the bottom the corresponding water pressure would drop from −9.53 to −8.66 psi. The suspension pressure is −7.8 psi at the top of the filter unit and +5.2 psi at the bottom of the filter unit. The net backwash pressure thus ranges from −8.67 to −7.8 psi at the top of the filter unit 5 and is in the range of −4.33 to −3.46 psi at the bottom of the filter unit. Although the backwash pressure is not uniform over the height of the filter unit 5, this differential is not of much concern because both pressures are negative. All that is required to commence the backwash cycle is that a negative pressure be exerted at all points from inside the filter unit 5 to outside the filter unit to push the filter cloth 18 outwardly.

The principles, preferred embodiments and modes of operation of the present invention have been described in the foregoing specification. The invention which is intended to be protected herein should not be construed as limited to the particular forms disclosed, since these are to be regarded as illustrative rather than restrictive. Variations and changes may be made by those skilled in the art without departing from the spirit of the present invention.

What is claimed is:

1. Filtering apparatus comprising:
   tank means including a receiver for filter cake;
   filter means in said tank means spaced above said receiver, said filter means including a tubular support screen and a filter cloth having liquid impermeable zones, said cloth substantially covering the exterior of said screen;
   an accumulator grating substantially surrounding said screen and spaced outwardly from said screen a distance greater than the thickness of said cloth, said grating having openings therein of sufficiently small size to retain temporarily the filter cake as it is pressed progressively through the grating during subsequent backwashing cycles;
   supply means for supplying a liquid-solids suspension to said tank means on one side of said filter means;

a filtrate compartment spaced above said filter means for receiving filtrate passing through to the other side of said filter means, whereby during the filtering process the liquid of the liquid-solids suspension flows from the supply means through the filter means and gravity provides a reverse flow to backwash the filter means and dislodge the filter cake that adheres to said filter cloth by pressing the filter cake into said accumulator grating.

2. The apparatus according to claim 1 wherein said tank means includes a sealed partition forming a floor of said filtrate compartment, said sealed partition having a plurality of said filter means suspended therefrom.

3. The apparatus of claim 1 wherein said support screen is spaced away from said accumulator grating by a distance approximating the combined thickness of the filter cloth and the anticipated filter cake.

4. The apparatus according to claim 1 wherein the support screen is made of a substantially rigid material.

5. The apparatus of claim 1 wherein the accumulator grating is made of an expanded sheet metal mesh.

6. The apparatus according to claim 1 wherein the support screen is made of a metal pipe having substantially vertical corrugations in a central portion of said pipe.

7. The apparatus of claim 1 wherein said supply means includes a centrifugal pump for supplying liquid-solids suspension to said tank means, and said receiver being in the shape of a funnel with control valve means to allow discharge periodically while maintaining a predetermined level of filter cake in said receiver.

8. The apparatus of claim 7 wherein said tank means has a substantially greater height than width so that an appreciable hydrostatic head can be built up in said receiver so that said filter cake can accumulate to a substantial depth thereby being somewhat compressed to expel fluid therefrom and so that said filter cake can be easily discharged by the high hydrostatic head when said control valve means is opened.

9. The apparatus of claim 1 including an overflow means for withdrawing filtrate from said filtrate compartment.

10. The filtering apparatus of claim 1 wherein said zones are in the form of narrow bands arranged to provide a plurality of separated filtering areas.

11. Filtering apparatus comprising:
tank means including a receiver for filter cake;
filter means in said tank means spaced above said receiver, said filter means including a cloth having liquid impermeable narrow bands arranged to form a plurality of separated filtering areas;
supply means for supplying a liquid-solids suspension to said tank means on one side of said filter means;
a filtrate compartment spaced above said filter means for receiving filtrate passing through to the other side of said filter means whereby during the filtering process the liquid of the liquid-solids suspension flows from the supply means through the filter means and gravity provides a reverse flow to backwash the filter means and dislodge the filter cake;
overflow means for withdrawing filtrate from said filtrate compartment;
a second filtrate compartment spaced above said first mentioned filtrate compartment; and
a centrifugal pump located between said first and said second filtrate compartments, said centrifugal pump being activated to pump filtrate liquid from said second filtrate compartment back into said first filtrate compartment thus momentarily reversing the flow of liquid across said filter means to thereby clear said filter means.

12. In liquid filter apparatus of the type having a filter cloth separating first and second fluid chambers, the improvement comprising:
a rigid and liquid permeable support tube, the interior of said tube forming at least a portion of said first fluid chamber, said tube being mounted in said apparatus with its longitudinal axis substantially vertical;
a filter cloth covering the outer surface of said support tube, said second fluid chamber being on the exterior of said filter cloth;
an accumulator grating superimposed over said filter cloth, said filter cloth being mounted to be pressed against said support tube when liquid is flowing through said cloth into said first fluid chamber, and to expand away from said support tube and toward said grating when liquid flows through said cloth into said second fluid chamber, whereby the filter cake which is formed on the filter cloth, is squeezed into the accumulator grating and is eventually extruded through the accumulator grating.

13. The liquid filtering apparatus of claim 12 wherein said support tube includes a corrugated tube portion, and said filter cloth encases said tube portion, and wherein said filter cloth has liquid impermeable strips that intersect one another to form separate filtering areas on said filter cloth.

14. A process for filtering a liquid-solids suspension comprising:
passing a liquid portion of the suspension through a filter cloth by means of a pressure differential between the front side and rear side of the filter cloth such that the liquid portion of the suspension flows through said filter cloth to become filtrate and a solids portion of the suspension collects on said filter cloth as filter cake, said cloth having liquid impermeable zones;
maintaining said filter cloth in a predetermined position during said passing step;
intermittently backwashing the liquid portion in a reverse direction through said filter cloth;
allowing said filter cloth to be displaced away from said predetermined position during said backwashing step;
collecting the solids portion from said front side of the filter cloth on an accumulator grating thereby clearing the solids portion deposited on the front side of the filter cloth,
and
subsequently passing a liquid portion of the suspension again through the filter cloth with said liquid portion flowing through the portion of said grating which overlies said liquid impermeable zones without dislodging filter cake on said grating.

15. The process of claim 14 wherein the backwashing is achieved by shutting down a centrifugal pump used to pump the suspension into said suspension compartment thereby lowering the pressure in said suspension compartment and allowing a created differential hydrostatic head of said filtrate to force said filtrate to flow back through said filter cloth thereby dislodging said solids from said filter cloth.

16. The process of claims 14 further comprising:
opening a valve at a bottom of said suspension compartment thereby creating a flow of suspension out of said suspension compartment to further drop the pressure therein, thus accelerating the release of the solids portions from said filter cloth.

17. The process according to claim 14 including the additional step of extruding the solids portion by displacement of preceding collections of solids during each subsequent backwashing step.

18. A process for filtering a liquid-solids suspension comprising:

passing a liquid portion of the suspension through a filter cloth by means of a pressure differential between the front side and rear side of the filter cloth such that the liquid portion of the suspension flows through said filter cloth to become filtrate and a solids portion of the suspension collects on said filter cloth as filter cake;

maintaining said filter cloth in a predetermined position during said passing step;

intermittently backwashing the liquid portion in a reverse direction through said filter cloth;

said backwashing step being achieved by activating a centrifugal pump in a filtrate compartment, said centrifugal pump pressurizing said filtrate to a higher pressure than said suspension is pressurized, thereby forcing said filtrate to flow back through said filter cloth to thereby dislodge said solids from said filter cloth;

allowing said filter cloth to be displaced away from said predetermined position during said backwashing step; and collecting the solids portion from said front side of the filter cloth in an accumulator grating thereby clearing the solids portion deposited on the front side of the filter cloth.

19. A process for filtering a liquid-solids suspension comprising:

passing a liquid portion of the suspension through a filter cloth having narrow liquid-impermeable bands arranged to form a plurality of separated filtering areas by means of a pressure differential between the front side and rear side of the filter cloth such that the liquid portion of the suspension flows through the filter cloth to become filtrate and a solids portion of the suspension collects on the filter cloth as filter cake;

maintaining said filter cloth in a predetermined position during said passing step;

intermittently backwashing the liquid portion in a reverse direction through the filter cloth to disengage the solids portion in individual segments corresponding to said filtering areas between said bands from said plurality of filtering areas;

collecting the solids portions from said filter cloth in an accumulator grating during said backwashing step; and after said backwashing step reversing the flow of the suspension again with said suspension flowing first through said grating areas that were aligned with said liquid impermeable bands;

whereby the solids portion is accumulated on said grating in separated areas corresponding to the areas on said filter cloth and reverse flow initially passes through the grating between the separated areas and the solids portion remains on the grating until dislodged by subsequent backwashing steps.

20. The process of claim 19 wherein the backwashing is achieved by activating a centrifugal pump in a filtrate compartment, said centrifugal pump pressurizing said filtrate to a higher pressure than said suspension is pressurized to, thereby forcing said filtrate to flow back through said filter cloth to thereby dislodge said solids from said filter cloth.

21. The process of claim 19 wherein said backwashing step includes opening a valve at a bottom of said suspension compartment to thereby create a flow of suspension out of said suspension compartment thereby lowering the pressure in said suspension compartment and allowing the created differential hydrostatic head of said filtrate to force said filtrate to flow back through said filter cloth to thereby dislodge said solids portion from said filter cloth.

* * * * *